United States Patent

Huang

[11] Patent Number: 5,842,849
[45] Date of Patent: Dec. 1, 1998

[54] GAS BURNER

[76] Inventor: Hsu-Sheng Huang, No. 1151, Ta Kang Lang, Pu Tzu Chen, Chiayi Hsien, Taiwan

[21] Appl. No.: 924,620

[22] Filed: Sep. 5, 1997

[51] Int. Cl.⁶ .................................................... F23Q 9/00
[52] U.S. Cl. ......................................... 431/284; 126/39 R
[58] Field of Search .................................... 431/278, 284; 126/39 R, 39 H

[56] References Cited

U.S. PATENT DOCUMENTS 5,401,164  3/1995  Yen ......................................... 431/284
5,639,232  6/1997  Bogenschutz et al. ................ 126/39 R
5,704,774  1/1998  Hsieh ....................................... 431/278

*Primary Examiner*—Carroll B. Dority
*Attorney, Agent, or Firm*—Merchant, Gould, Smith, Edell, Welter & Schmidt, P.A.

[57] ABSTRACT

A gas burner includes a base member to which a plurality of nozzles is disposed and a disk is mounted to the base member with a plurality of gas supplying tubes connected between the disk and the base member. A central head member and a plurality of chambers are respectively mounted to the disk and communicate with the gas supplying tubes respectively. Each of the chambers and the central head member has a plurality of openings defined therethrough.

9 Claims, 7 Drawing Sheets

GAS BURNER

BACKGROUND OF THE INVENTION

1. Field of the Invention

The present invention relates to a burner and, more particularly, to a gas burner having a plurality of combustion chambers each communicating with an independent gas supplying tube.

2. Brief Description of the Prior Art

FIG. 1 shows a cross-sectional view of a conventional gas burner which includes an upper plate 80 with at least one hole 801 defined therethrough so as to let three gas supplying tubes 85, 851, 852 extend therethrough. A main pipe 802 has three nozzles 81, 82, 83 communicating therewith which respectively communicate with the three gas supplying tubes 85, 851, 852 so that gas passing into the gas supplying tubes 85 can be burned. An inherent shortcoming of the conventional gas burner is that one of the nozzles 81, 82, 83, the valve 81 for example, could be clogged by food which has overflowed from a container (not shown) on the burner. In this case, the gas pressure will raised within each of the remaining two gas supplying tubes 851, 852. Furthermore, because there is an annular passage 84 communicating with the three gas supplying tubes 85, 851, 852 so that gas will flow into the gas supplying tube 85. The existence of the gas could result in a large and sudden flame when a user activates an ignition device.

The present invention intends to provide an improved gas burner to mitigate and/or obviate the above-mentioned problems.

SUMMARY OF THE INVENTION

The present invention provides a gas burner which includes a base member having a bottom and a peripheral wall on which a disk is mounted. A central, nozzle and a plurality of nozzles are respectively disposed to the bottom, each of the central nozzle and the nozzles communicating with a gas supplying tube fitted to the bottom 11. The disk has a central hole and a plurality of apertures defined therethrough. A central head member is mounted to the disk and communicates with the central hole, the central head member having a plurality of openings defined therethrough. A plurality of chambers are securely mounted to the disk and respectively communicate with the apertures. Each of the chambers has a plurality of openings defined therethrough.

It is an object of the present invention to provide a gas burner having a plurality of independent combustion chambers and each of the combustion chambers communicates with a gas supplying tube.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
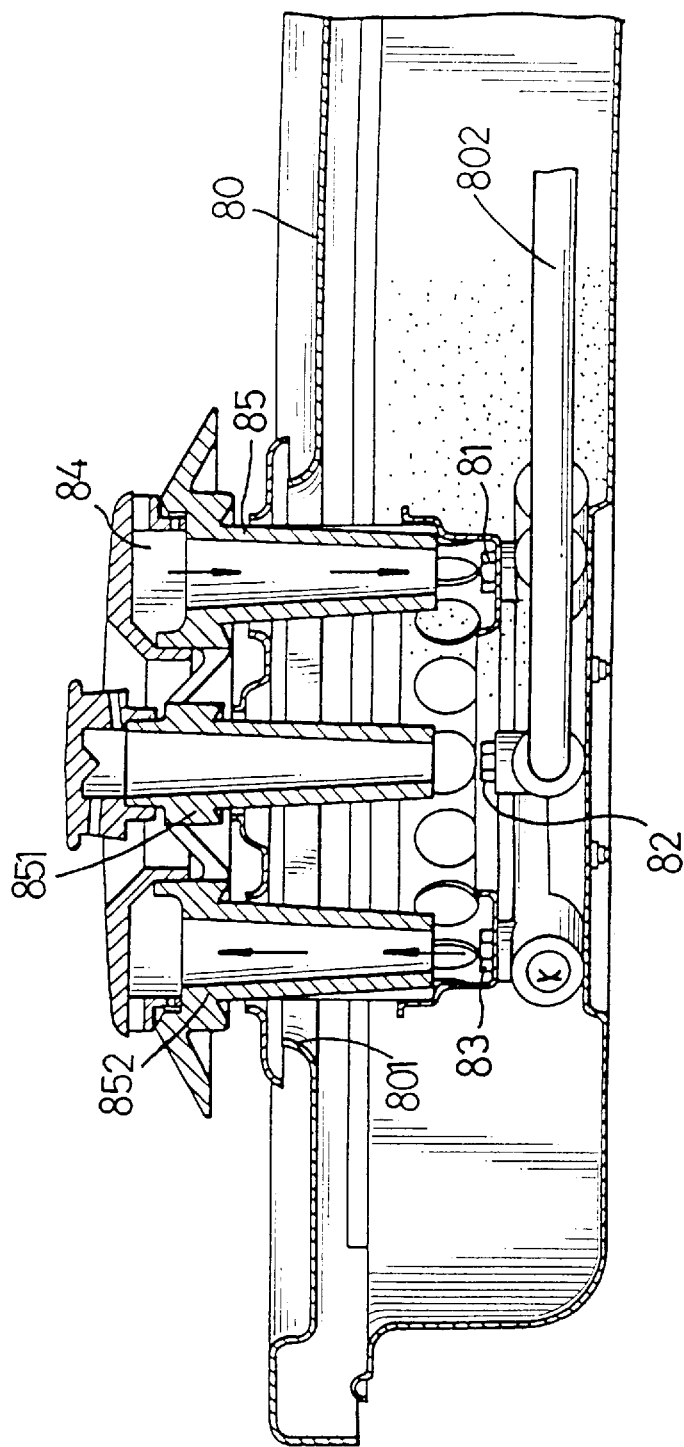
FIG. 1 is a side elevational view, partly in section, of a conventional gas burner.
Figure 2:
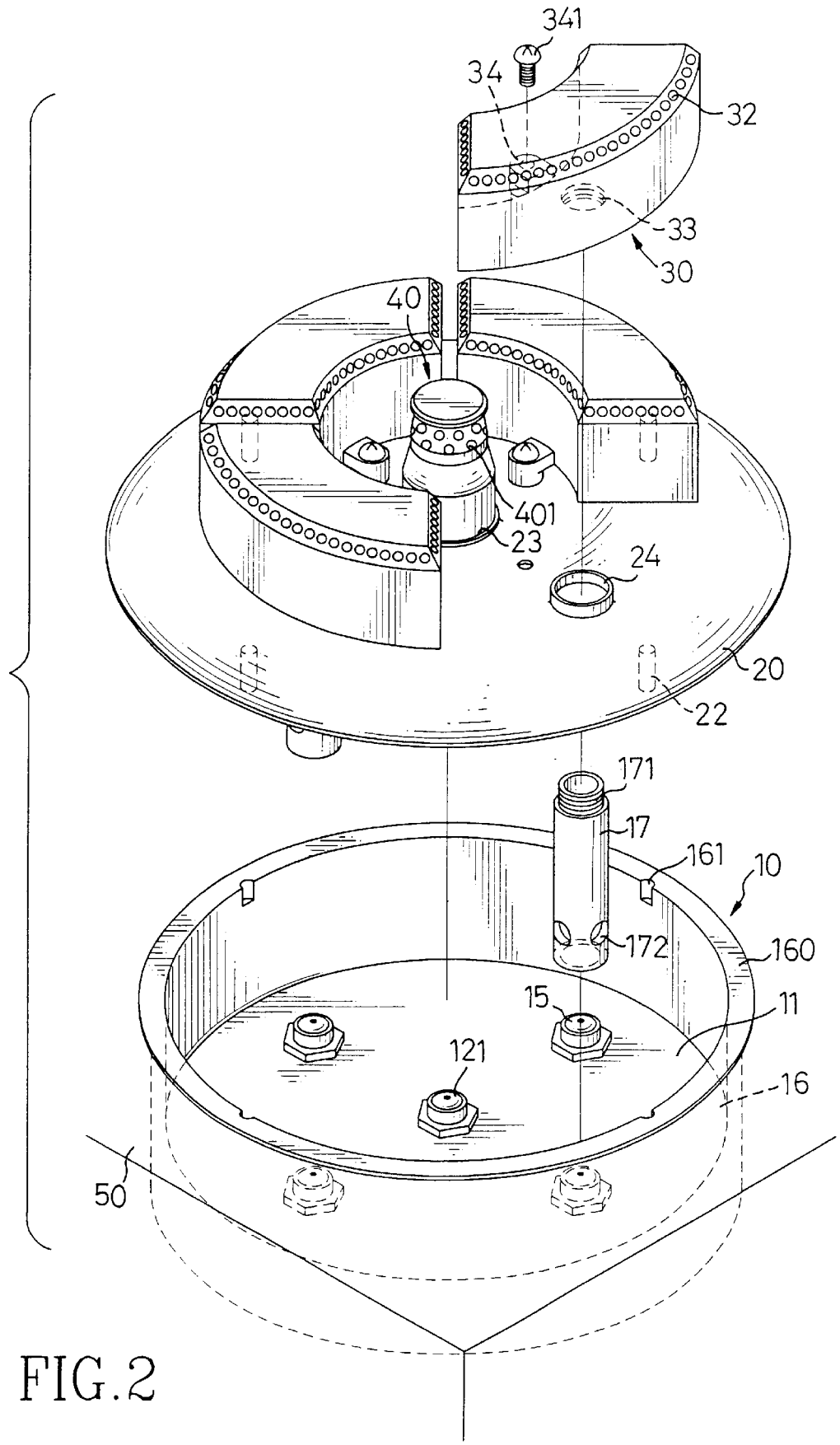
FIG. 2 is an exploded view of a gas burner in accordance with the present invention.
Figure 3:
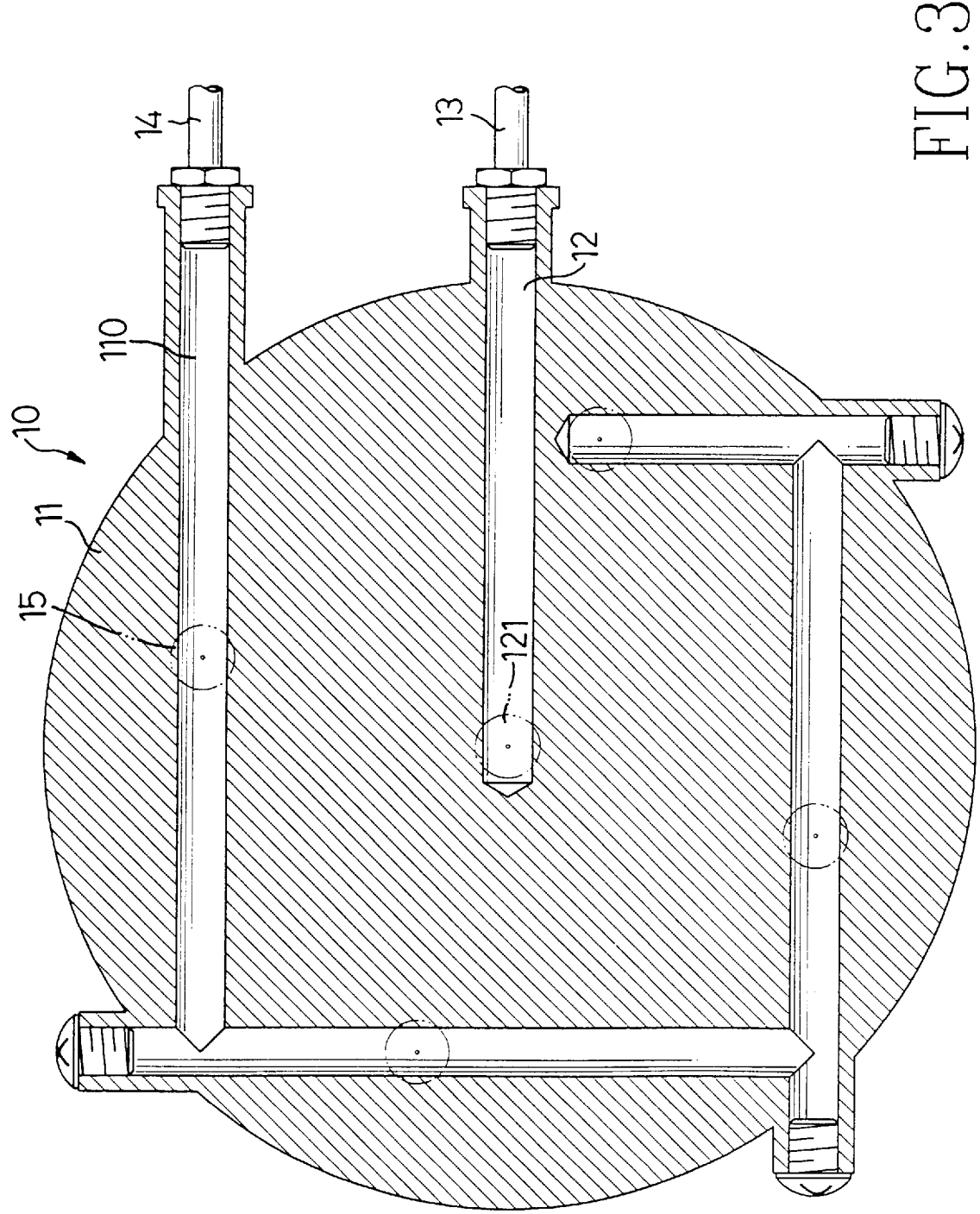
FIG. 3 is a bottom plan view, partly in section, of a base member.
Figure 4:
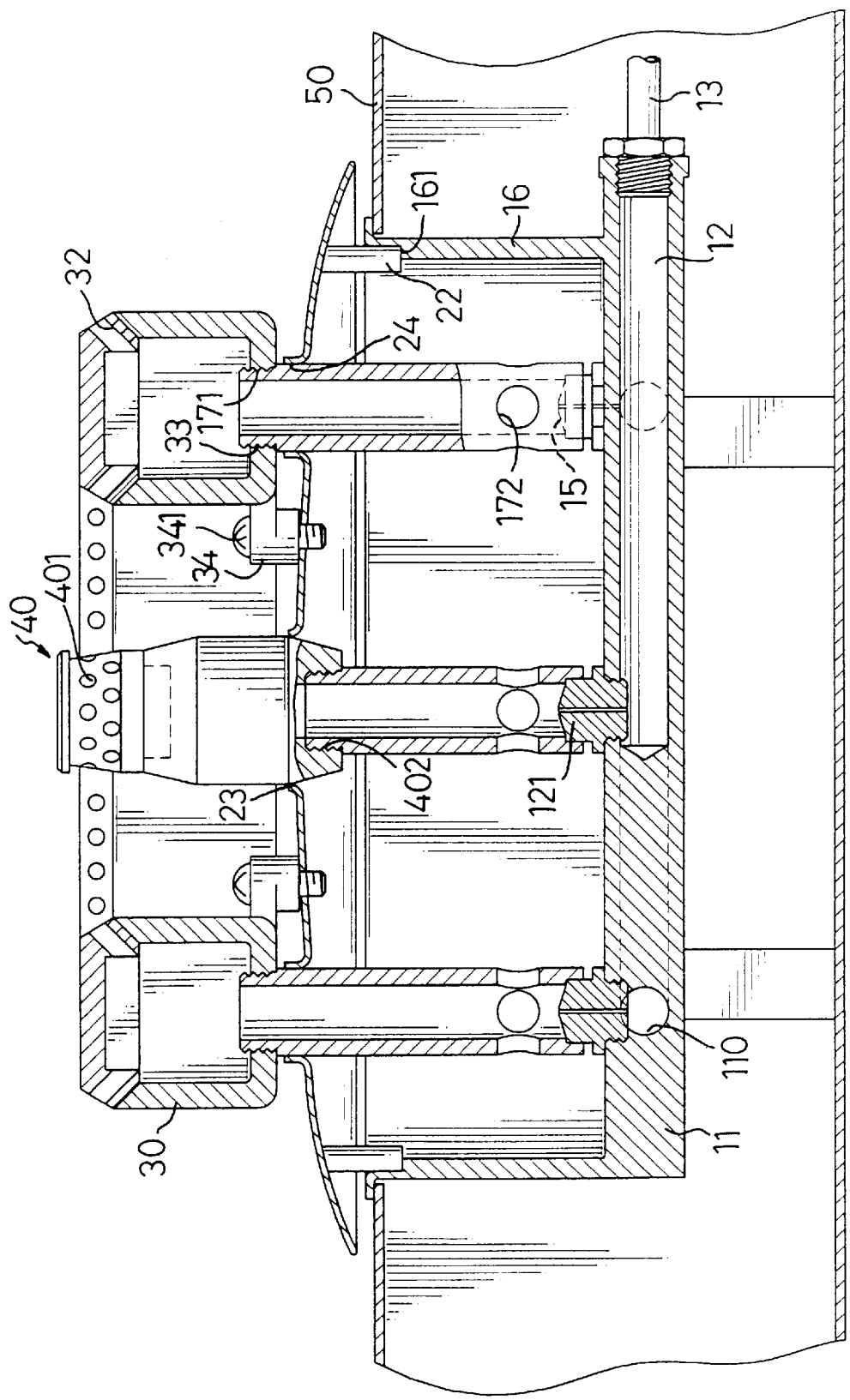
FIG. 4 is a side elevational view, partly in section, of the gas burner in accordance with the present invention.
Figure 5:
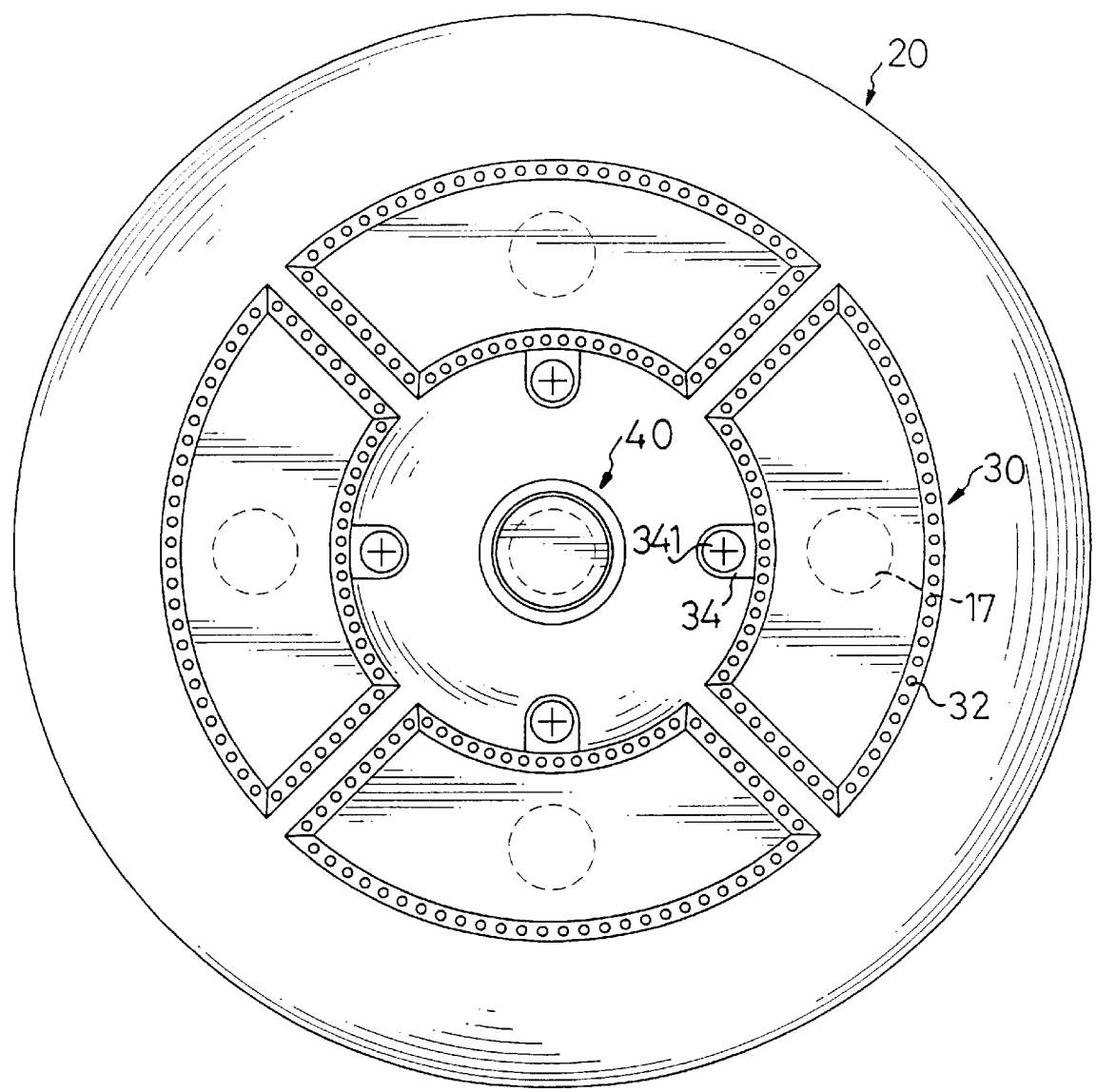
FIG. 5 is a top plan view of the gas burner.

Referring to the drawings and initially to FIGS. 2 through 5, a gas burner in accordance with the present invention generally includes a base member 10 having a bottom 11 and a peripheral wall 16 extending from a periphery of the bottom 11. A central nozzle 121 and a plurality of nozzles 15 are respectively disposed on the bottom 11. Each of the central nozzle 121 and the nozzles 15 communicate with a respective one of a plurality of gas supplying tubes 17 fitted to the bottom 11. Each of the gas supplying tubes 17 has a plurality of holes 172 defined therein so as to provide oxygen in the gas supplying tubes 17 thereby, and has a threaded section 171 extending from a top thereof. The peripheral wall 16 of the base member 10 has a plurality of recesses 161 defined in an inner periphery thereof and further has a flange 160 extending radially and outwardly from a top thereof so that the flange 160 is supported on a stove 50. In FIG. 3, a first passage 110 is defined in the bottom 11 and communicates with the nozzles 15. A second passage 12 is defined in the bottom 11 and communicates with the central valve 121. A pipe 14 is connected to the bottom 11 and communicates with the first passage 110 so as to provide gas to the nozzles 15. A second pipe 13 is connected to the bottom 11 and communicates with the second passage 12 so as to provide gas to the central nozzle 121.

Referring to FIG. 2, disk 20 has a plurality of studs 22 extending downwardly from a bottom thereof so as to be received in the recesses 161 so that the disk 20 may securely rest on the peripheral wall 16 of the base member 16. The disk 20 has a central hole 23 and a plurality of apertures 24 defined therethrough. A central head member 40 is mounted to the disk 20 and communicates with the central hole 23 and has a plurality of openings 401 defined therethrough. A plurality of chambers 30 each have a lug member 34 extending laterally therefrom so as to be fixedly disposed on the disk 20 by bolts 341 and respectively communicate with the apertures 24. Each of the chambers 30 has a plurality of openings 32 defined therethrough. Each of the chambers 30 and the central head member 40 has a screw hole 33/402 (FIGS. 2 and 4) defined in a bottom thereof so as to receive the threaded sections 171 of the gas supplying tubes 17.

Accordingly, each of the chambers 30 has one gas supplying tube 17 connected therewith and is separated from each other so that if one of the nozzles 15 is clogged, there will be no gas flowing into the gas supplying tube 17 corresponding to the clogged nozzle 15.

Figure 6:
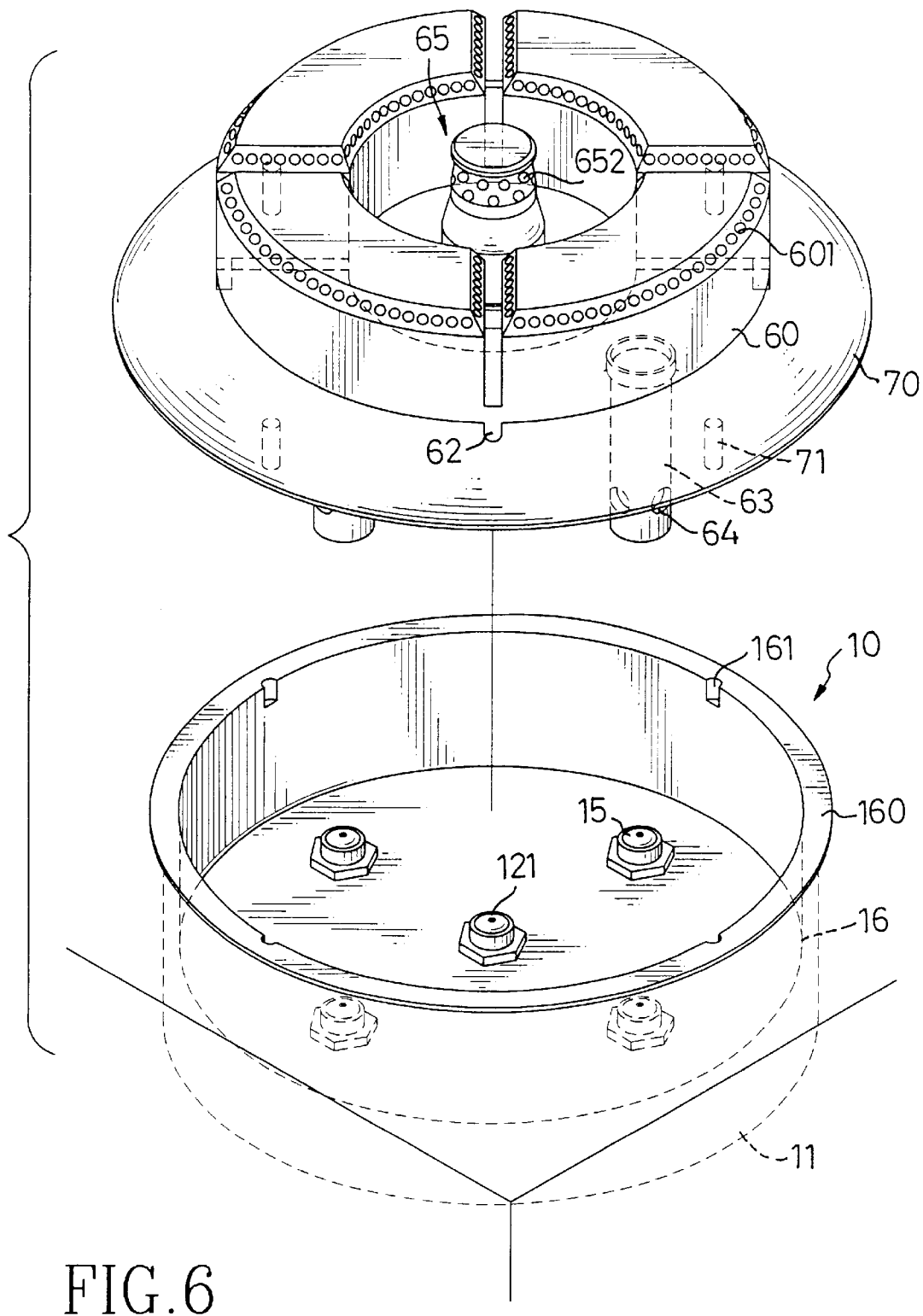
FIG. 6 is an exploded view of another embodiment of the gas burner in accordance with the present invention.
Figure 7:
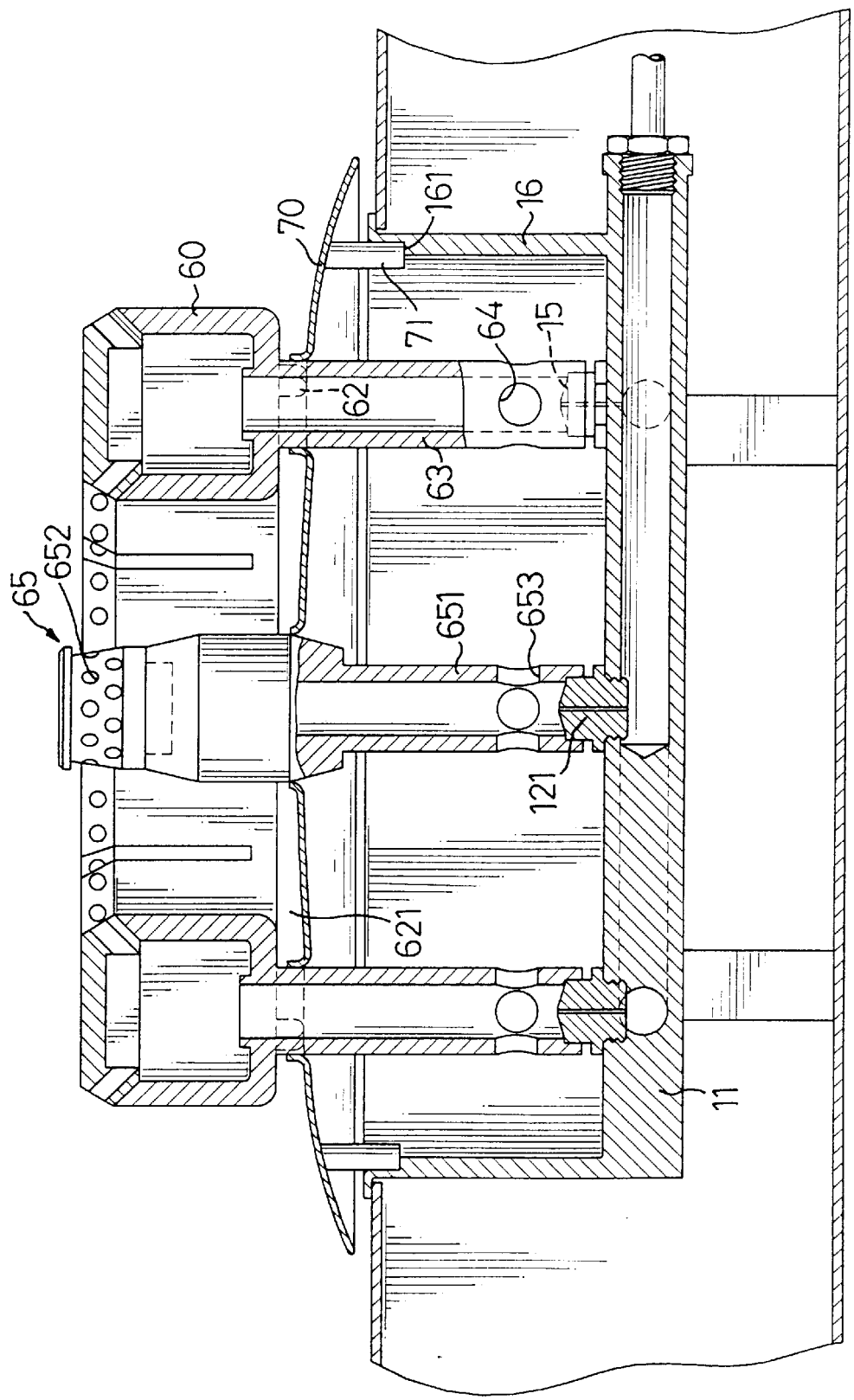
FIG. 7 is a side elevational view, partly in section, of the gas burner shown in FIG. 6.

FIGS. 6 and 7 show another embodiment of the present invention, which includes a base member 10 same as the base member shown in FIGS. 2–5 and has a bottom 11 and a peripheral. wall 16 extending from a periphery of the bottom 11, a central nozzle 121 and a plurality of nozzles 15 respectively disposed on the bottom 11. The peripheral wall 16 of the base member 10 has a plurality of recesses 161 defined in an inner periphery thereof.

A disk 70 has a plurality of studs 71 extending downwardly from a bottom thereof so that the disk 70 is securely mounted on the peripheral wall 16 of the base member 10 by receiving the studs 71 being received in the recesses 161. A central head member 65 and an annular member 60 are respectively mounted to the disk 20, wherein the central head member 65 has a first tube 651 extending downwardly therefrom and through the disk 70 and the annular member 60 has a plurality of second tubes 63 extending downwardly therefrom and through the disk 70. Each of the first and the second tubes 651, 63 has a plurality of holes 653, 64 defined therein. A plurality of stands 62 extend downwardly from the annular member 60 so as to abut the disk 70 and define a plurality of slots 621 between the annular member 60 and the disk 70. The annular member 60 has a plurality of independent spaces defined therein and each of the spaces communicates with one of the second tubes 63. The first tube 651 communicates with the central nozzle 121 and the second tubes 63 respectively communicate with the nozzles 15. The central head member 65 has a plurality of openings 652 defined therethrough and the annular member 60 has a plurality of openings 601 defined therethrough.

Although the invention has been explained in relation to its preferred embodiment, it is to be understood that many other possible modifications and variations can be made without departing from the spirit and scope of the invention as hereinafter claimed.

What is claimed is:

1. A gas burner comprising:

a base member having a bottom and a peripheral wall extending from a periphery of said bottom, a central nozzle and a plurality of nozzles respectively disposed on said bottom, each of said central nozzle and said plurality of valves communicating with a gas supplying tube fitted to said bottom, and a disk 20 securely mounted on said peripheral wall of said base member and having a central hole 23 and a plurality of apertures 24 defined therethrough, a central head member 40 mounted to said disk and communicating with said central hole, said central head member having a plurality of openings defined therethrough, a plurality of chambers securely mounted to said disk and respectively communicating with said apertures, each of said chambers having a plurality of openings defined therethrough.

2. The gas burner as claimed in claim 1 wherein each of said gas supplying tubes has a plurality of holes defined therein.

3. The gas burner as claimed in claim 1 wherein each of said gas supplying tubes has a threaded section extending from a top thereof, each of said chambers and said central head member having a screw hole defined in a bottom thereof so as to receive said threaded sections of said gas supplying tubes.

4. The gas burner as claimed in claim 1 wherein said peripheral wall of said base member has a plurality of recesses defined in an inner periphery thereof, said disk having a plurality of studs extending downwardly from a bottom thereof so as to be received in said recesses.

5. The gas burner as claimed in claim 1 wherein each of said chambers has a lug member extending laterally therefrom so as to be fixedly disposed on said disk by bolts.

6. A gas burner comprising:

a base member having a bottom and a peripheral wall extending from a periphery of the bottom, a central nozzle and a plurality of nozzles respectively disposed on said bottom, and a disk 20 securely mounted on said peripheral wall of said base member and having a central head member and an annular member mounted to said disk, said central head member having a first tube extending downwardly therefrom and through said board, said annular member having a plurality of second tubes extending downwardly therefrom and through said disk, said annular member having a plurality of independent spaces defined therein and each of said spaces communicating with one of said second tubes said first tube communicating with said central nozzle and said second tubes respectively communicating with said plurality of nozzles, said central head member having a plurality of openings defined therethrough and said annular member having a plurality of openings defined therethrough.

7. The gas burner as claimed in claim 6 wherein each of said first and said second tubes has a plurality of holes defined therein.

8. The gas burner as claimed in claim 6 wherein said peripheral wall of said base member has a plurality of recesses defined in an inner periphery thereof, said disk having a plurality of studs extending downwardly from a bottom thereof so as to be received in said recesses.

9. The gas burner as claimed in claim 6 wherein a plurality of stands extend downwardly from said annular member has so as to abut said disk and define a plurality of slots between said annular member and said board.

\* \* \* \* \*